(No Model.) 2 Sheets—Sheet 2.
E. FAHRIG.
PROCESS OF EXTRACTING FAT FROM WOOL.
No. 534,602. Patented Feb. 19, 1895.
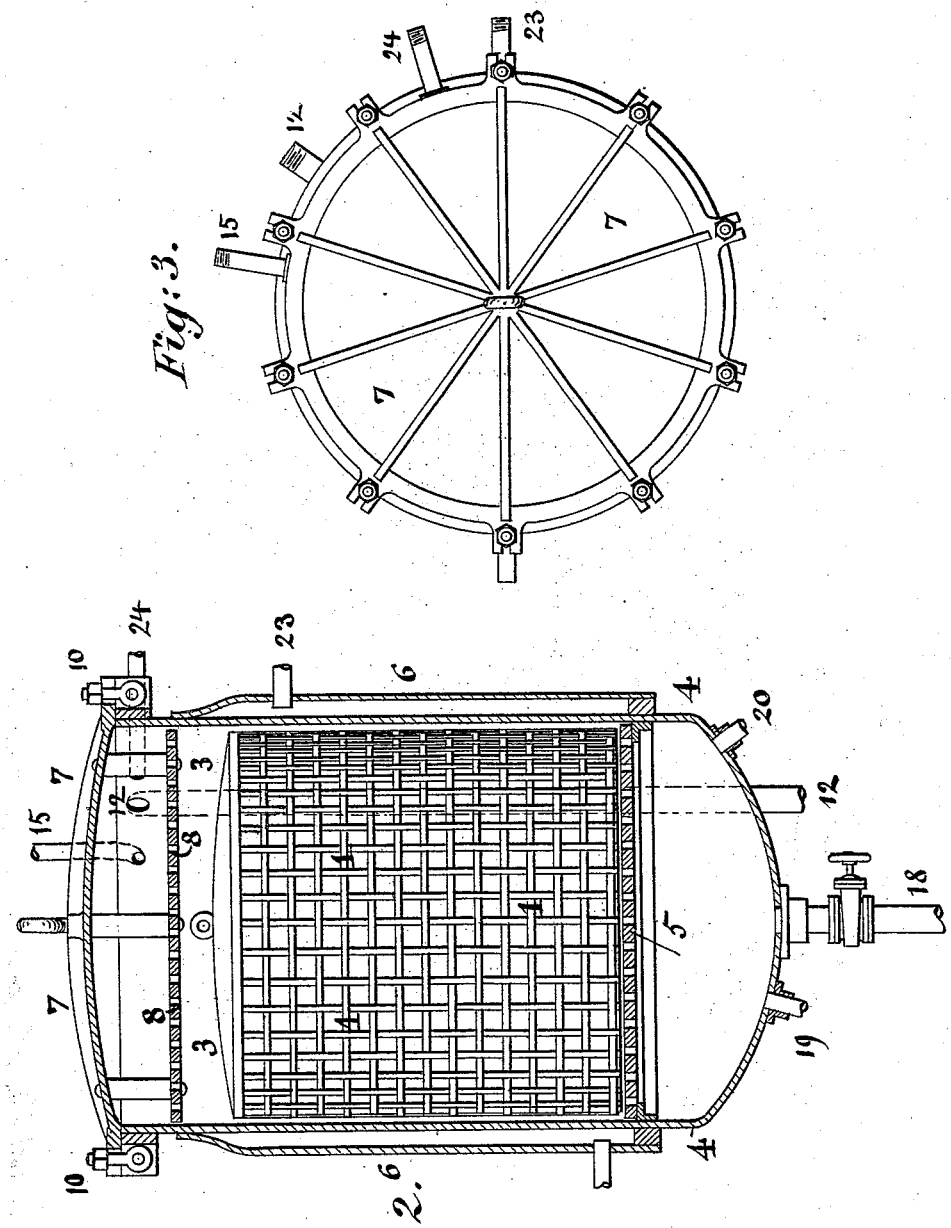

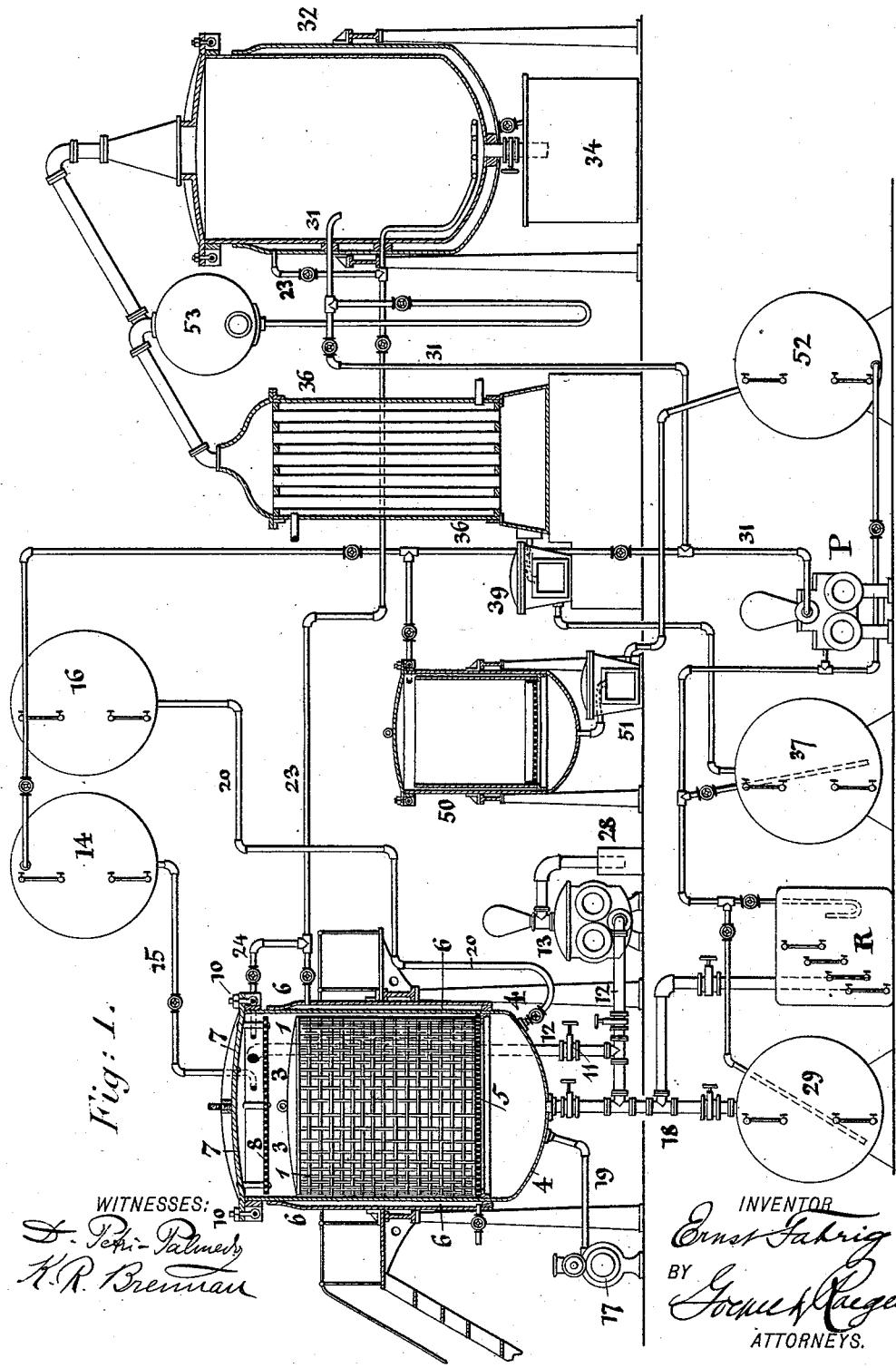

UNITED STATES PATENT OFFICE.

ERNST FAHRIG, OF BALTIMORE, MARYLAND, ASSIGNOR TO THE STANDARD WOOL CLEANING COMPANY, OF NEW JERSEY.

PROCESS OF EXTRACTING FAT FROM WOOL.

SPECIFICATION forming part of Letters Patent No. 534,602, dated February 19, 1895.

Application filed July 5, 1894. Serial No. 516,571. (No specimens.)

*To all whom it may concern:*

Be it known that I, ERNST FAHRIG, a citizen of the United States, residing in the city of Baltimore and State of Maryland, have invented certain new and useful Improvements in the Process of Extracting Fat from Wool and other Fibrous Materials, of which the following is a specification.

The object of this invention is to provide an improved process of extracting fat from wool or other fibrous materials by the use of volatile hydro-carbon solvents, and separating the fat and oils so extracted from said solvents so as to utilize the same in the arts, while the wool or other fibrous material is rendered thereby free from oleaginous substances and impurities and better adapted for spinning and weaving; and the invention consists of the process herein described of extracting fat from wool or other fibrous materials, which consists, first, in exhausting the air from the fibrous material to be treated; next subjecting the same to the action of a volatile solvent which is alternately forced through the material first in one direction and then in the opposite direction; next drawing off the solvent and the extracted fat and oil, and then subjecting the fibrous material to heat so as to evaporate the solvent still retained in the same, and lastly condensing the resulting vapors.

The invention consists further of the process of extracting fat from wool or other fibrous materials, first, by exhausting the air from said material; second, by subjecting the same to the action of a volatile solvent passed through said material in one direction; third, drawing off the solvent and extracted fat; fourth, by subjecting the material to the action of another charge of the solvent passed through the same in the opposite direction; fifth, drawing off the solvent and the oil and fat dissolved therein, then subjecting the fibrous material to the action of heat, so as to evaporate the solvent still remaining in the same, and finally condensing the vapors drawn off.

In the accompanying drawings is shown one form of apparatus by which my improved process is carried out in practice.

Figure 1 represents a side-elevation partly in section, of the apparatus, and Fig. 2 a vertical central section of the extractor drawn on a larger scale, and Fig. 3 a top-view of the same.

Similar figures and letters of reference indicate corresponding parts.

My process can be used to advantage in removing the fat, oils, &c., from any oleaginous material, but it is especially designed to remove the oil or fat contained in wool or other fibrous materials, and at the same time clean the wool and deliver it ready for manufacturing purposes, without waste or shrinkage and free from injury to the fibers.

The wool or other material to be treated is first subjected to pressure and baled while under pressure. The baled material is then placed in a basket 1, made of non-oxidizable metal, which will not be injurious to the wool. This basket is then lowered by means of a crane or other suitable device, into the middle compartment 3 of the extractor 4. The compartment 3 is provided with a false perforated bottom 5, as shown in Fig. 2, and surrounded by a steam-jacket 6.

The extractor 4 is constructed so as to withstand high pressure, and is provided with a removable cover 7. This cover is adapted to fit tightly over the top of the extractor and to seal hermetically the compartment 3 of the same. The cover 7 is also provided with a perforated diaphragm 8, which is suspended therefrom by means of suitable hanger-bolts. The cover 7 is firmly screwed down by means of hinged screws 10, and provided with a safety-valve, while the extractor is provided with gages, a test tube and other accessories. After the compressed bale of fibrous material is placed into the compartment 3 of the extractor, the cover 7 is put on and secured in place, so as to hermetically seal the compartment 3. The extractor 4 is connected by a valved pipe 15 with an elevated tank 14 for the naphtha or other volatile solvent and by a valved pipe 12 with an air-pump 13. The jacket of the extractor is connected by a pipe 23 with a steam-boiler, so as to supply live steam to the same, while live or exhaust-steam is supplied to the interior of the compartment 3 by a valved pipe 24. The bottom of the extractor is connected by a pipe 18 with a receptacle 29 for the solvent and the fat extracted from the material in the extractor, and by a valved pipe 19 with an agitating pump 17. The bottom of the extractor 4 is further connected by a valved pipe 20 with a second tank 16 for a second charge of naphtha or other volatile solvent. The tank 14 and supply-pipe 15 serve to supply the extractor with solvent that passes through the material in one direction, while the tank 16 and pipe 20 supply the extractor with another charge of solvent which enters from the bottom and passes through the material in a direction opposite to that of the solvent from the tank 14.

In carrying out my improved process of extracting fat from wool, the compressed material is first placed in the compartment 3 and then the cover put in place, and hermetically sealed thereon. The valves of all the pipes leading to the extractor are closed, except the valve 11 of pipe 12. The air-pump 13 is then put in operation and the air exhausted from the compartment 3 and from the material in the same. The valve 11 is closed after the required degree of vacuum is established in the compartment 3. The solvent from the tank 14 is then let into the compartment 3 through the pipe 15, which preferably enters above the diaphragm 8, so as to be distributed uniformly by the same over the material below. When the gages show that the material is entirely covered by the solvent, the valve in the pipe 15 is closed and the supply of solvent stopped. Owing to the high vacuum in the extractor the solvent penetrates into all the available spaces of the fibrous material, so as to act on the entire body of the same. When the solvent has penetrated the material, the pump 17 is set in operation, and thereby the agitation of the solvent in the extractor produced, so that it passes through the material and tends to free it from the fat, oil and impurities contained therein. The solvent containing the fat is then drawn off through the pipe 18 into a receptacle R and pumped back to the tank 14, by the pump P and connecting pipes so as to be passed repeatedly through the extractor until it contains from twenty to twenty-five per cent. of fat and fatty acids.

In order to completely free the fibrous material from fat, it is subjected to a second washing, by opening the valve of the pipe 20 and passing a fresh charge of volatile solvent from the tank through the material, said fresh charge passing through the material from the bottom in upward direction, that is to say, in an opposite direction to the direction of the former charge from the tank 14. When the material is fully covered by the solvent, the supply of solvent is stopped, and the valve of the pipe 19 is opened so as to connect with the pump 17, which is then set again in operation so as to produce the agitation of the solvent in the extractor, for dissolving the oil in the fibrous material, the material being thus elutriated, first, by the first charge of solvent in one direction, and then by the second charge of solvent in the opposite direction. The solvent with the fat extracted thereby is drawn off through the pipe 18 into the receptacle R and pumped back to the tank 16 by the pump P, it being used over again until it contains from twenty to twenty-five per cent. of fat and fatty acids. By the test-tube, the condition of the material in the extractor is observed from time to time, and the time when the solvent is to be drawn off regulated thereby.

The wool or other fibrous material in the extractor will retain a small quantity of the solvent which will not run off into the tank 29 by the means provided, and it is therefore necessary to free the material in the extractor of this solvent before it can be removed from the extractor, and a new charge of wool put into the same. In order to accomplish this, live steam is let into the jacket 6 of the compartment 3 through the pipe 23 and at the same time, steam let into the compartment 3 through the valved pipe 24. The steam-pipe 24 is arranged to enter the compartment 3 above the perforated diaphragm 8 while the steam-pipe 23 is connected directly with the jacket. After the steam is admitted into the compartment 3, the pump 13 is set in operation, said pump having been previously connected with the pipe 18 by opening the lower valve of the connecting-pipes 7 and 12. The heat generated by the steam admitted to the jacket 6 and into the compartment 3 will vaporize the solvent held in suspension in the material, and the action of the pump 13 will draw off the vapors thus formed through the pipes 18 and 12, thence through the pump 13 into a washer 28, where the vapors mixed with water are condensed and then separated therefrom and recovered. The wool is then removed from the compartment 3, and a new charge placed in the same and the operation of extracting the fat from the new charge repeated as before.

When a test shows that the solvent contains from twenty to twenty-five per cent. of fat and fatty acids, the separation of the solvent from said fat has to be performed. This is accomplished in the usual manner by separating the liquid solvent by distillation from the fatty matter, and then condensing the vapors and collecting the condensed solvent ready for further use.

Before the solvent is separated from the fatty matter by distillation the raw product which has become dirty and discolored in the extracting is pressed through the filter so as to remove the foreign matters and impurities suspended therein. The filtering operation is accelerated by establishing by the air-pump 13 a low vacuum on the filter 50; but not only the impurities are removed from the solvent by the filter but also the discoloring matter, so after distillation of the solvent a pure grease of light color is obtained. This filtering is accomplished by running the solvent with the fat into the tank 29, pumping it through the filter 50 and tell-tale 51, and into a tank 52, and then by the pump P and pipe 31 into the still 32. The still 32 is heated by means of steam, which is supplied by the pipe 23 to the jacket and to a coil at the interior of the still. In the still the fat and fatty acids are separated from the solvent and conducted into the tank 34, while the vapors formed in the still are drawn off into a catch-all 53, and then into a condenser 36, in which they are condensed.

The condenser 36 consists of a cylindrical vessel having perforated top and bottom diaphragms, which are connected by vertical pipes, said pipes being surrounded with water supplied from a suitable tank, the warm water being conducted off by a suitable wastepipe. The condensed solvent is passed from the condenser through a tell-tale 39 into the tank 37, from which it is returned by the action of the pump P into the tank 14 or 16 so as to be used again for the extraction of fat from other charges of fibrous materials placed in the extractor.

The separation of the volatile solvent from the fat and fatty acids by distillation can be accomplished by any other suitable means, as this part of the process is well known and can be performed in different ways.

Having thus described my invention, I claim as new and desire to secure by Letters Patent—

1. The process herein described of extracting fat from wool and other fibrous materials, which consists in the following steps: first, exhausting the air from the material to be treated; second, subjecting the material *in vacuo* to the action of a volatile solvent forced alternately in opposite directions through the material; third, withdrawing the solvent with the extracted mass from the material *in vacuo;* fourth, vaporizing the residual solvent by the action of heat and drawing off the vapors thus formed from the material *in vacuo*, substantially as set forth.

2. The process herein described of extracting fat from wool and other fibrous materials, which consists of the following steps: first, exhausting the air from the material to be treated; second subjecting the material to the action of an initial charge of a volatile solvent passed through the same in one direction; third, drawing off the solvent with the fat extracted from the material; fourth, subjecting the material to the action of a second charge of a volatile solvent and passing the same in opposite direction to the former charge through the material; fifth, drawing off the second charge of solvent with the extracted fat; sixth, subjecting the material to the action of heat so as to evaporate the solvent retained in the material and lastly condensing the resultant vapors, substantially as set forth.

In testimony that I claim the foregoing as my invention I have signed my name in presence of two subscribing witnesses.

ERNST FAHRIG.

Witnesses:
PAUL GOEPEL,
K. R. BRENNAN.